(12) United States Patent
Bernasconi

(10) Patent No.: US 6,956,993 B2
(45) Date of Patent: Oct. 18, 2005

(54) ARRAYED WAVEGUIDE GRATINGS WITH IMPROVED TRANSMISSION EFFICIENCY

(75) Inventor: Pietro Arturo Giovanni Bernasconi, Eatontown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 152 days.

(21) Appl. No.: 10/608,751

(22) Filed: Jun. 27, 2003

(65) Prior Publication Data

US 2004/0264857 A1 Dec. 30, 2004

(51) Int. Cl.$^7$ .............................. G02B 6/34; G02B 6/42
(52) U.S. Cl. ........................... 385/37; 385/46; 385/47
(58) Field of Search ....................... 385/14–18, 20, 385/31–32, 37, 46–48, 50, 52, 24, 129–132; 356/138, 139.05

(56) References Cited

U.S. PATENT DOCUMENTS

| | | | | |
|---|---|---|---|---|
| 5,136,671 A | * | 8/1992 | Dragone | 385/46 |
| 5,745,612 A | * | 4/1998 | Wang et al. | 385/24 |
| 5,822,481 A | * | 10/1998 | Mestric | 385/46 |
| 6,058,233 A | * | 5/2000 | Dragone | 385/46 |
| 6,181,849 B1 | * | 1/2001 | Lin et al. | 385/24 |
| 6,351,583 B1 | * | 2/2002 | Bergmann et al. | 385/24 |
| 6,381,383 B1 | * | 4/2002 | Bernasconi et al. | 385/24 |
| 6,418,249 B1 | * | 7/2002 | Nakamura et al. | 385/24 |
| 6,490,395 B1 | * | 12/2002 | Nara et al. | 385/39 |
| 6,549,698 B2 | * | 4/2003 | Bernasconi et al. | 385/24 |
| 6,597,841 B1 | * | 7/2003 | Dingel | 385/37 |
| 6,678,446 B1 | * | 1/2004 | McGreer et al. | 385/37 |
| 6,741,772 B2 | * | 5/2004 | Ide | 385/37 |
| 6,768,842 B2 | * | 7/2004 | Bulthuis et al. | 385/37 |
| 6,810,167 B2 | * | 10/2004 | Tabuchi et al. | 385/24 |
| 6,810,177 B2 | * | 10/2004 | Kaneko | 385/37 |
| 2002/0089721 A1 | * | 7/2002 | Nicolas | 359/128 |
| 2003/0063858 A1 | * | 4/2003 | Bulthuis et al. | 385/37 |

OTHER PUBLICATIONS

"PHASAR–Based WDM–Devices: Principles, Design and Applications", M. K. Smit and C. van Dam, IEEE Journal of Selected Topics in quantum Electronics, vol. 2, No. 2, Jun. 1996, pp. 236–250.

"32 x 32 Arrayed–Waveguide Grating Multiplexer with Uniform Loss and Cyclic Frequency Characteristics", K. Okamoto et al., Electronics Letters, vol. 33, No. 22, pp. 1865–1866.

* cited by examiner

*Primary Examiner*—Frank G. Font
*Assistant Examiner*—Ryan Lepisto

(57) ABSTRACT

An arrayed waveguide grating (AWG) with improved transmission efficiency includes an input P×M star coupler, an output M×Q star coupler, and M waveguides of unequal length connecting the input and output star couplers. A novel method used to determine the optimum position of the ports ensures that the maximum frequency deviation between the signal frequency and the center of the corresponding transmission passband is minimal for all possible connections among input and output ports.

17 Claims, 6 Drawing Sheets

ARRAYED WAVEGUIDE GRATINGS WITH IMPROVED TRANSMISSION EFFICIENCY

CROSS-REFERENCE TO RELATED APPLICATIONS

This application is related to U.S. Pat. No. 6,381,383, issued Apr. 30, 2002, which is incorporated herein by reference in its entirety.

FIELD OF THE INVENTION

This invention relates to the field of arrayed waveguide grating devices and, more specifically, to arrayed waveguide gratings with improved filter accuracy.

BACKGROUND OF THE INVENTION

In order to meet the ever-increasing demand for transmission bandwidth in communication networks, the development of techniques for Wavelength Division Multiplexing (WDM) is increasing in importance. In particular, in dense WDM (DWDM), the use of the available optical bandwidth is optimized by increasing the system spectral efficiency (i.e., the ratio between signal bandwidth and channel spacing). This is achieved by employing many closely spaced carrier wavelengths multiplexed together onto a single waveguide such as an optical fiber and/or by increasing the signal modulation speed of every single data channel.

Because the channels' spectra are more closely packed, the ability of separating or merging channels without introducing any additional signal penalty is becoming of great importance. Therefore, optical filters are being developed with filter response and frequency alignment that provide for a better match to the signal frequencies.

An important class of such optical filters is represented by Arrayed Waveguide Gratings (AWGs). An arrayed waveguide grating (AWG) is a planar structure comprising a number of array waveguides whose arrangement emulates the functionality of a diffraction grating (see e.g. M. K Smit and C. van Dam, "Phasar based WDM devices: Principles, design, and applications," *IEEE J. Select. Topics Quantum Electron.*, vol 2, pp.236–250, 1996). AWGs are commonly used as multiplexers or demultiplexers (i.e., devices that can merge a multitude of optical frequencies from multiple inputs to a single output port or separate a multitude of optical frequencies from a single input to multiple output ports, respectively). Furthermore, AWGs can also be designed to perform as passive, wavelength selective, strictly non-blocking cross-connects for sets of optical channels. For example, AWGs can simultaneously operate as a multiplexer and demultiplexer by distributing and recombining multiple frequencies entering any of a multitude of input ports into any of a multitude of output ports (see e.g. C. Dragone, "An N×N optical multiplexer using a planar arrangement of two star couplers," *IEEE Photon. Technol. Lett.*, vol. 3, pp. 812–815, 1991). Because of this property and uncommon versatility, AWGs are attracting an increasing interest for large optical cross-connect systems.

The use of AWGs, however, presents some limitations. Due to the intrinsic diffraction characteristics of an AWG, the maximum channel count or maximum spectral width of this kind of devices may be limited. Additional limitations arise if the AWG is designed to cross-connect channels that are equally spaced in frequency to be compliant with the industry International Telecommunications Union (ITU) standard frequency grid as opposed to being equally spaced in wavelength (see e.g. P. Bernasconi, C. Doerr, C. Dragone, M. Cappuzzo, E. Laskpwski, and A. Paunescu, "Large N×N Waveguide grating routers," *J. Lightwave Technol.*, vol. 18, pp. 985–991, 2000).

SUMMARY OF THE INVENTION

The present invention advantageously provides for an arrayed waveguide grating with improved transmission efficiency.

In one embodiment of the present invention a method for improving the transmission efficiency of an arrayed waveguide grating (AWG) comprising P input ports and Q output ports (P×Q AWG), includes a novel positioning of the ports at the input of a first P×M star coupler and at the output of a second M×Q star coupler, M being the number of waveguides connecting the star couplers. The novel method used to determine the optimum position of the ports ensures that the maximum frequency deviation between the signal frequency and the center of the corresponding transmission passband is minimal for all possible connections among input and output ports.

In an embodiment of the present invention, an AWG with improved transmission efficiency includes an input P×M star coupler, an output M×Q star coupler, and a plurality of waveguides of unequal length connecting the input and output star couplers. A first input port of the AWG is initially positioned near the center of the input star coupler. The initial positions of the output ports of the AWG are as such defined by the images of the wavelengths dispersed by the first input port. The remaining P−1 input ports of the AWG are initially positioned as defined by the images of the wavelengths dispersed by a substantially central output port. An angular spread, $\Delta\vartheta_q$, for each of the Q output ports is then determined, where $\Delta\vartheta_q$ is the angular spread of the images of wavelengths of all of the input ports expected to converge on each of the output ports. Final positions of the input ports are then defined by the subsequent variation of the initial positions of the input ports, such that the value of $\Delta\vartheta_{MAX}$ is minimized, where $\Delta\vartheta_{MAX}$ is a maximum one of respective angular spreads, $\Delta\vartheta_q$, of the images of the wavelengths expected to converge for each of the output ports. The output ports of the AWG are finally positioned such that each output port is positioned in substantially the center of its respective final angular spread, $\Delta\vartheta_q$, where the respective final angular spreads are defined by the images of the wavelengths dispersed by the finally positioned input ports.

In an alternate embodiment of the present invention, the center axis of the output ports of an output star coupler of an AWG are again repositioned to maximize the weakest wavelength signal transmission coefficient for any wavelength dispersed from any of the input ports of an input star coupler, instead of being in the center of their respective angular spreads $\Delta\vartheta_q$. As such the transmission coefficient for the AWG is increased.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides for an arrayed waveguide grating with improved transmission efficiency. Although embodiments of the present invention are being described herein with respect to P×Q arrayed waveguide gratings (AWGs), it will be appreciated by those skilled in the art informed by the teachings of the present invention, that the concepts of the present invention may be applied to AWGs of various other input and output port configurations and even further to other optical cross connect switches and devices.

Figure 1:
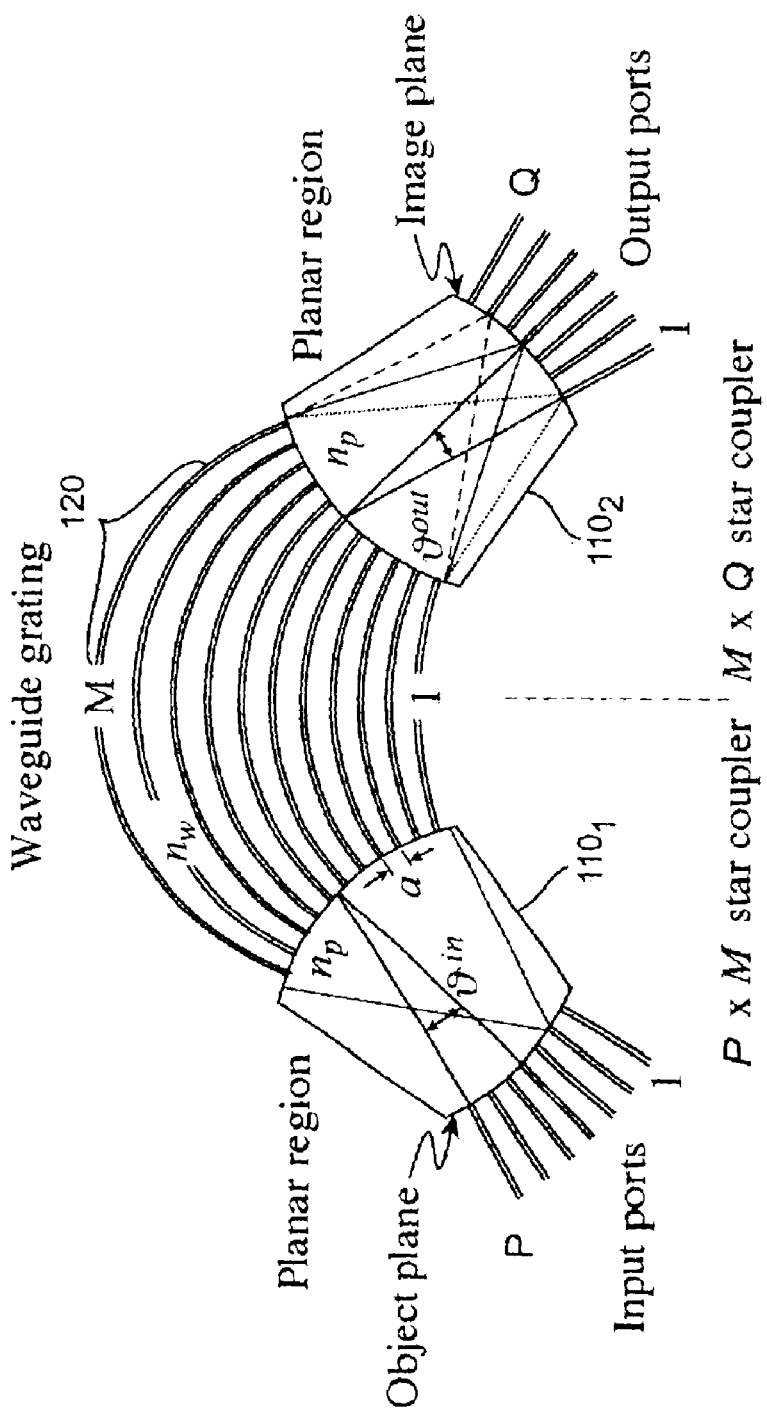
FIG. 1 depicts a high-level block diagram of an embodiment of an arrayed waveguide grating.

FIG. 1 depicts a high-level block diagram of an embodiment of an arrayed waveguide grating (AWG). The AWG 100 of FIG. 1 is essentially an imaging system where the object and the image planes lie at opposite sides of two star couplers $110_1$, $110_2$ connected by M waveguides 120 of unequal lengths. The desired diffraction properties arise from the varying lengths (typically linearly increasing lengths) of the M waveguides 120, such that different wavelengths at the same input position of the first P×M star coupler $110_1$ are spatially separated to form an image comb at the output of the second M×Q star coupler $110_2$. The spatial structure of the image comb nominally does not depend on the input position but only on the grating properties and on the input wavelengths.

The diffraction properties of the AWG 100 may be described in the paraxial approximation by the following relation:

$$an_p(\vartheta_\lambda^{in} - \vartheta_\lambda^{out}) + n_w \Delta L = m\lambda \quad (1)$$

where a is the grating period, $\vartheta^{in/out}$ are the incident and the diffracted angles, respectively, for the wavelength λ, ΔL is the optical path difference between neighboring grating arms, $n_{p/w}$ are the refractive indices in the planar and grating regions, respectively, and m is an integer corresponding to the order of diffraction. From equation (1) above, the inventors determined that:

i) channels evenly spaced in wavelength will generate image combs with evenly spaced teeth, ii) channels evenly spaced in frequency will generate image combs with monotonically increasing teeth distance, and iii) teeth spacing depends on the diffraction order m.

Therefore, the optimum performance is obtained from P×Q AWGs that use optical channels evenly spaced in wavelength and that operate within a single diffraction order. Deviations from this condition will lead to a deterioration of the alignment between filter passbands and optical signals and a consequent decrease of the device's performance.

Figure 2:
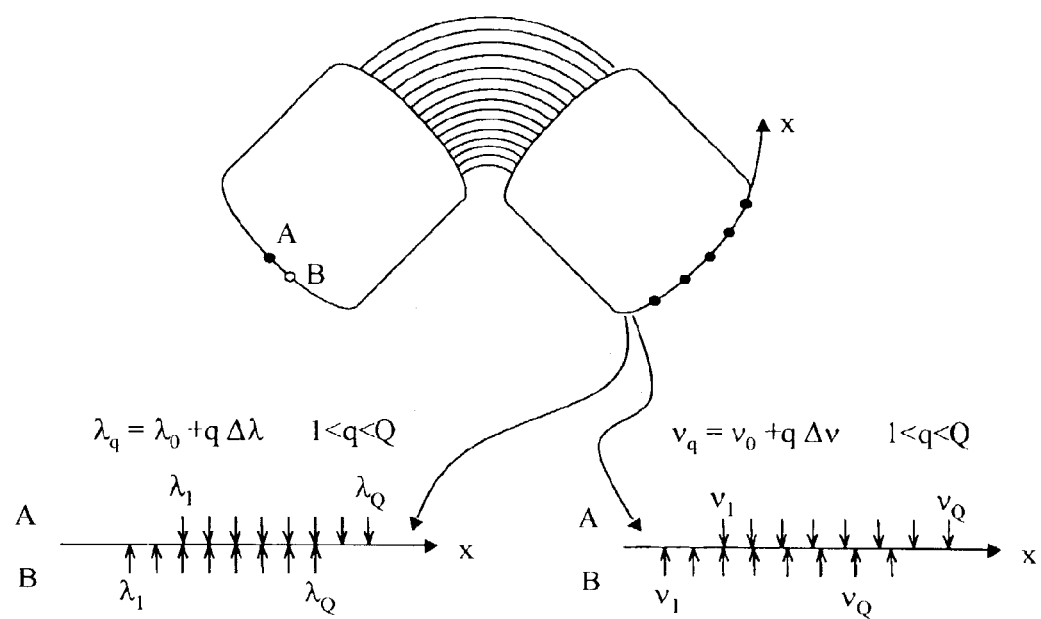
FIG. 2 depict a high-level block diagram of an arrayed waveguide grating with two possible objects at the first star coupler and the possible images generated by different wavelengths/frequencies at the end of the second star coupler.

From equation (1), it may be determined that if the same set of wavelengths is launched from two distinct input ports, two nominally identical combs will appear shifted with respect to each other at the output of the star coupler $110_2$ as depicted in FIG. 2. FIG. 2 depicts a high-level block diagram of an arrayed waveguide grating with two possible objects (A and B) at the first star coupler and the possible images generated by different wavelengths/frequencies (black dots) at the end of the second star coupler. The space axis x of the image plane is duplicated below the plot for the cases of channels evenly spaced in wavelength (left) and in frequency (right). The arrows indicate the position of the images corresponding to different wavelengths or frequencies when generated at the input location A (above the axis) or B (below the axis).

The image combs are depicted as arrays of arrows pointing at the image locations along the x-axis that characterizes the image plane. Two different situations a represented: Channels evenly spaced in wavelength ($\lambda_q = \lambda_o + q\Delta\lambda$, $\Delta\lambda$ is the channel spacing, 1<q<Q), and channels evenly spaced in frequency ($\nu_q = \nu_o + q\Delta\nu$, $\Delta\nu$ is the channel spacing, 1<q<Q). The wavelength combs have evenly spaced teeth so that when they originate from two distinct input locations A and B they appear shifted to each other but their teeth may still coincide in the overlap region. The frequency combs have unevenly spaced teeth, therefore when shifted with respect to each other, no two consecutive points coincide within the overlap region.

The full cross-connectivity between input and output ports will be achieved when the teeth of all the image combs locally overlap. Therefore, an optimal configuration would require a constant distance between the comb's teeth and, consequently, the ports of the AWG to be equally spaced.

Because WDM systems are moving toward higher channel counts often combined with a higher spectral efficiency, the constraints of the filter response or the ability of the devices to separate channels, is getting tighter. As such, a need for better alignment of the filter transmission passband to the channel frequency, a wider and flatter passband, lower losses, and lower crosstalk are needed. Typically, P×Q AWGs (with P,Q>1) are characterized by Gaussian intensity responses, which enhances the required alignment accuracy to the optical channels in order not to magnify the transmission penalty due to additional insertion losses, asymmetric signal filtering, and increased crosstalk.

Current P×Q AWGs are affected by an intrinsic misalignment between the center of the transmission passband and the ITU frequency standards. Although this discrepancy may by negligible in AWGs handling a relatively narrow frequency span, this problem is becoming increasingly important in AWGs with large P and Q and narrow channel spacing.

The original P×Q AWG design, and still the one most commonly applied, possesses the property of having the same number of input and output ports (P=Q) and can provide full cross-connectivity by using a unique set of P different wavelengths. This arrangement takes advantage of the multiple images generated by an AWG in different diffraction orders to provide a fully periodic frequency response. Such AWGs are designed with the output ports covering an entire Brillouin zone of the grating, so that as soon as one channel falls out on one side of the sector occupied by the output ports, the next diffraction order moves in from the other side replacing the "lost" channel with its copy in the contiguous diffraction order.

Figure 3:
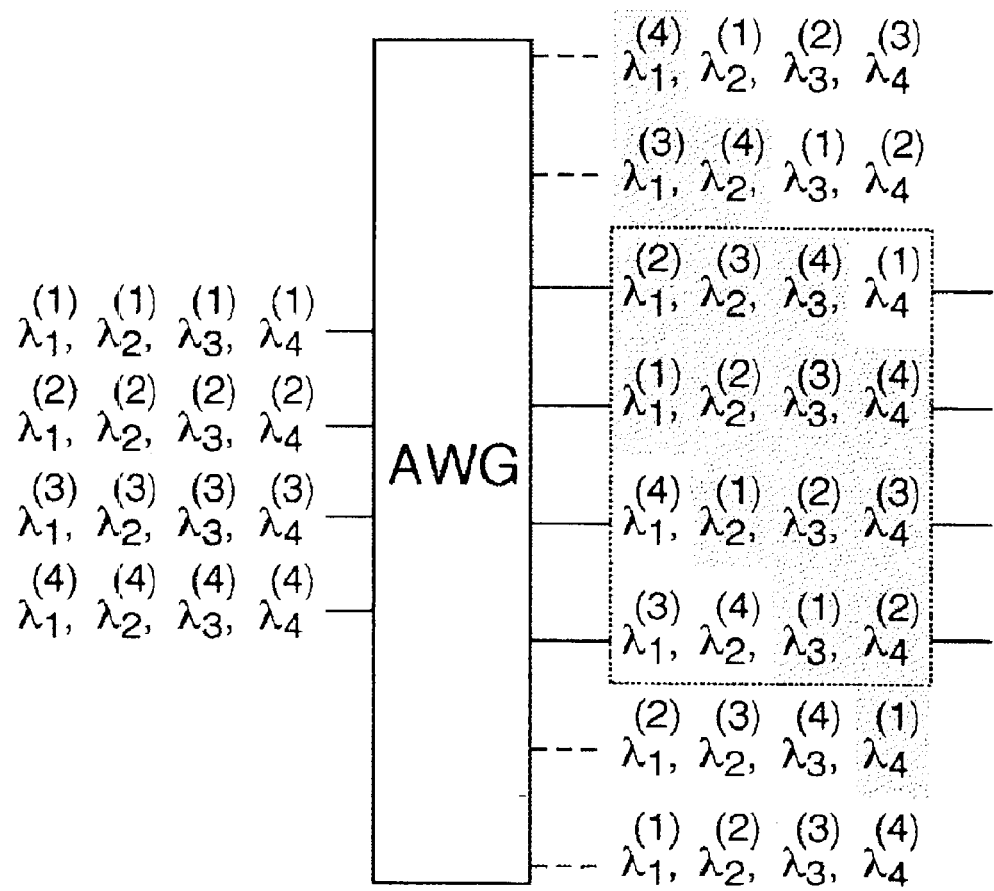
FIG. 3 depicts a high level block diagram of the periodic output response or wrap-around of a 4×4 arrayed waveguide grating.

FIG. 3 depicts a high level block diagram of the periodic output response or wrap-around of a 4×4 AWG 300. The wavelength's lower index designates the channel number while the upper index reveals the input port number. The gray region indicates the images belonging to the grating main diffraction order. The images of the wavelengths in the upper right (lower left) corner belong to the next higher (lower) diffraction order. Only four central output ports (in the dotted frame) are necessary for full cross-connectivity; the dashed output ports are redundant.

However, referring back to the equation (1) above, to provide the periodic response as depicted in FIG. 3, the AWG has to operate with three different diffraction orders. Because the angular spacing between optical channels is an explicit function of the diffraction order of the channel, the output positions of the multiple diffraction orders will not all fall at the same output location. As such, the task of matching specific output locations with three different periods poses a serious limitation for an AWG using multiple diffraction orders. The misalignment among the images that are supposed to overlap at specific output locations will negatively affect the transmission performance of the AWG.

A frequency misalignment consequent to the use of three diffraction orders may, however, be partially mitigated by an appropriate global shifting of the output ports as proposed in "Large N×N Waveguide Grating Routers", P. Bernasconi, C. Doerr, and C. Dragone, U.S. Pat. No. 6,381,383, filed on Apr. 30, 2002, which is herein incorporated by reference in its entirety. The Bernasconi patent, U.S. Pat. No. 6,381,383, teaches a novel method for arranging the spacing of the output ports of an output star coupler of a waveguide grating router so as to increase a signal transmission coefficient from each of the input ports to the output ports. The Bernasconi patent further describes how transmission coefficients vary for wavelengths originating from a given input port. The misalignment increases linearly with the distance between a central wavelength and a wavelength diffracted in the next higher or in the next lower diffraction order.

Figure 4:
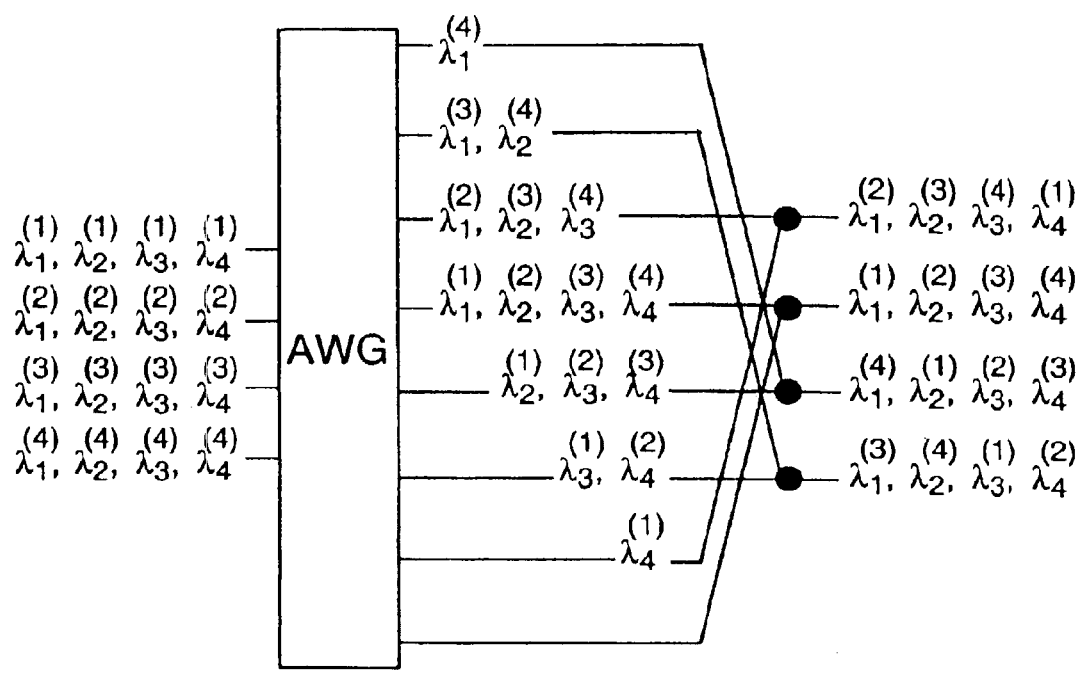
FIG. 4 depicts a high level block diagram of an embodiment of a 4×4 arrayed waveguide grating operating within a single diffraction order.

Another effective improvement in the frequency response is obtained by operating the AWG within a single diffraction order. This is achieved by doubling the number of output ports and eventually merging them into pairs to recover the original number of output ports as depicted in FIG. 4. FIG. 4 depicts a high level block diagram of an embodiment of a 4×4 arrayed waveguide grating operating within a single diffraction order. The AWG 400 of FIG. 4 comprises four input ports and eight intermediate output ports. The eight intermediate output ports are combined into four final output ports. Each of the four input ports of the AWG 400 comprises the same four input channels, $\lambda_1$–$\lambda_4$. The lower index in FIG. 4 depicts the channel number while the higher index depicts the input port number. In FIG. 4, only one grating diffraction order is depicted for the outputs.

Output ports i and i+P are complimentary to each other and by merging these pair of output ports, new output port combinations are obtained comprising all of the initial P=Q outputs on the now four combined output channels. For example, in FIG. 4 output port 1 and output port 5 are coupled together, output port 2 and output port 6 are coupled together, output port 3 and output port 7 are coupled together, and output port 4 and output port 8 are coupled together. As such, the periodic response of the AWG 400 is preserved even with the operation of the AWG with a single diffraction order.

Consequently, misalignments at the output ports are drastically reduced and nominally eliminated in cases where the optical channels are equally spaced in wavelength. In addition, improved loss uniformity can be guaranteed because of the lack of stringent constrains on the free spectral range of the AWG. Note that the channel mapping between input and output ports in FIG. 3 and FIG. 4 are substantially identical. However, a closer look reveals that at the output the images that are supposed to appear at a specific output port do not overlap exactly but are spread over a well defined space interval. This is even more evident when the frequency channels are aligned according to the ITU grid. The consequence is that channels equally spaced in frequency will be diffracted by an AWG with monotonically varying angular distance even within a single diffraction order. Since the image combs generated by two distinct input ports are shifted with respect to each other, it follows that a perfect overlap is not possible.

As such, one embodiment of the present invention provides a novel AWG where the P input and Q output ports positions are modified to correct for the limitations presented when optical channels are evenly spaced in frequency. Embodiments of the present invention also provide a method to determine the optimal position of the input and output ports for increasing a signal transmission coefficient and, as such, improving the transmission efficiency of a subject AWG. It should be noted that although the concepts of the present invention are being described herein with reference to a P×Q AWG, the concepts of the present invention may be applied in substantially any AWG with any number of input ports and output ports, and even further, to other optical cross connect switches and devices.

The method of one embodiment of the present invention begins with the design of a grating that will support the P×Q AWG. That is, an AWG with a sufficient number of needed input and output ports is chosen. The initial positions of the input ports and output ports of the AWG are then determined. More specifically, the initial positioning of the ports is accomplished by choosing an input position (usually substantially at the center of the input of a first star coupler) and finding where the different optical channels of an input signal with channels evenly spaced in frequency are imaged at the output of a second star coupler. The output ports of the second star coupler are, as such, positioned at positions defined by the images of the wavelengths dispersed by the substantially central input port. The position of the remaining P−1 input ports are then determined by following the same procedure above, but using a substantially central output port as a source. More specifically, a substantially central output port, determined by the input images, is chosen as a source and the remaining P−1 input ports of the AWG are positioned at positions defined by the images of the wavelengths dispersed by the substantially central output port.

In a second step, for every channel originating from every input position, the exact location of every image is calculated. In a third step, all the images that are expected to appear at any output port q (1<q<Q) are considered collectively, regardless of their diffraction order, and their angular spread $\Delta\vartheta_q$ determined. The fourth step consists of the identification of $\Delta\vartheta_{MAX}$ corresponding to the maximum value among $\Delta\vartheta_q$ (1<q<Q). In the next step, the position of the input ports is varied to minimize the value of $\Delta\vartheta_{MAX}$ by iteratively accomplishing steps two to four. When the value of $\Delta\vartheta_{MAX}$ is minimized, the final positions for the input ports have been determined. That is, the minimization process will deliver the optimum position of the input ports. The output ports will be finally positioned in the middle of respective $\Delta\vartheta_q$ intervals, defined by the images of the wavelengths dispersed by the finally positioned input ports. This method results in a decrease of $\Delta\vartheta_{MAX}$ by approximately a factor of two. This allows for the doubling of the number of channels that an AWG may efficiently handle for a given tolerated $\Delta\vartheta_{MAX}$, thus improving the filtering performance for a given number of channels.

In alternate embodiments of the present invention, the center axis of the output ports of the output star coupler of an AWG are repositioned to maximize the weakest wavelength signal transmission coefficient for any wavelength dispersed from any of the P input ports, instead of being in the center of their respective angular spreads $\Delta\vartheta_q$. As such the transmission coefficient for an AWG in accordance with one embodiment of the present invention is increased.

Figure 5:
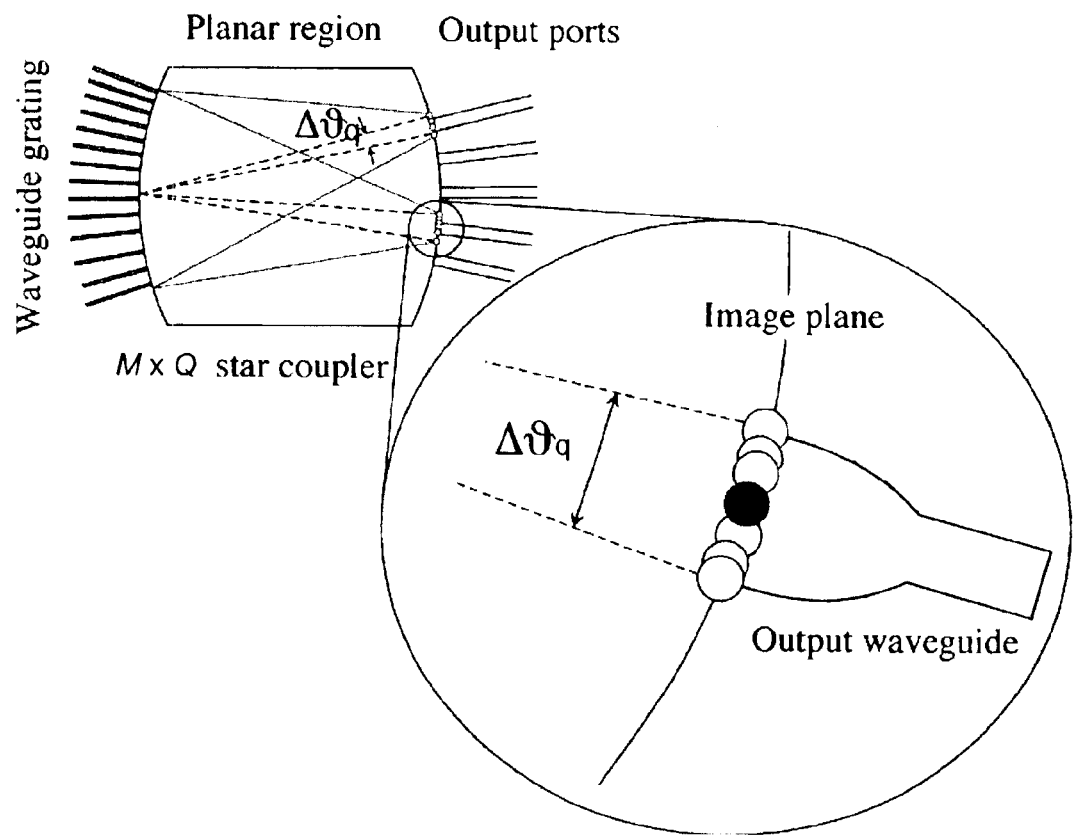
FIG. 5 depicts a high level block diagram of an output star coupler of an arrayed waveguide grating and the positioning of an output waveguide of the output star coupler in accordance with one embodiment of the present invention.

FIG. 5 depicts a high level block diagram of an output star coupler of an arrayed waveguide grating and the positioning of an output waveguide of the output star coupler in accordance with one embodiment of the present invention. In the detail circle of FIG. 5, the circles depict the focal positions of wavelengths originating from different input ports of the AWG expected to at the same output position. The darkened circle is located in the center of the angular interval $\Delta\vartheta_q$ defined by the extreme focal positions. As such, the output waveguide is aligned with respect to the center of the angular interval $\Delta\vartheta_q$ (e.g., the darkened circle of FIG. 5) to minimize the misalignment of the output port.

Figure 6:
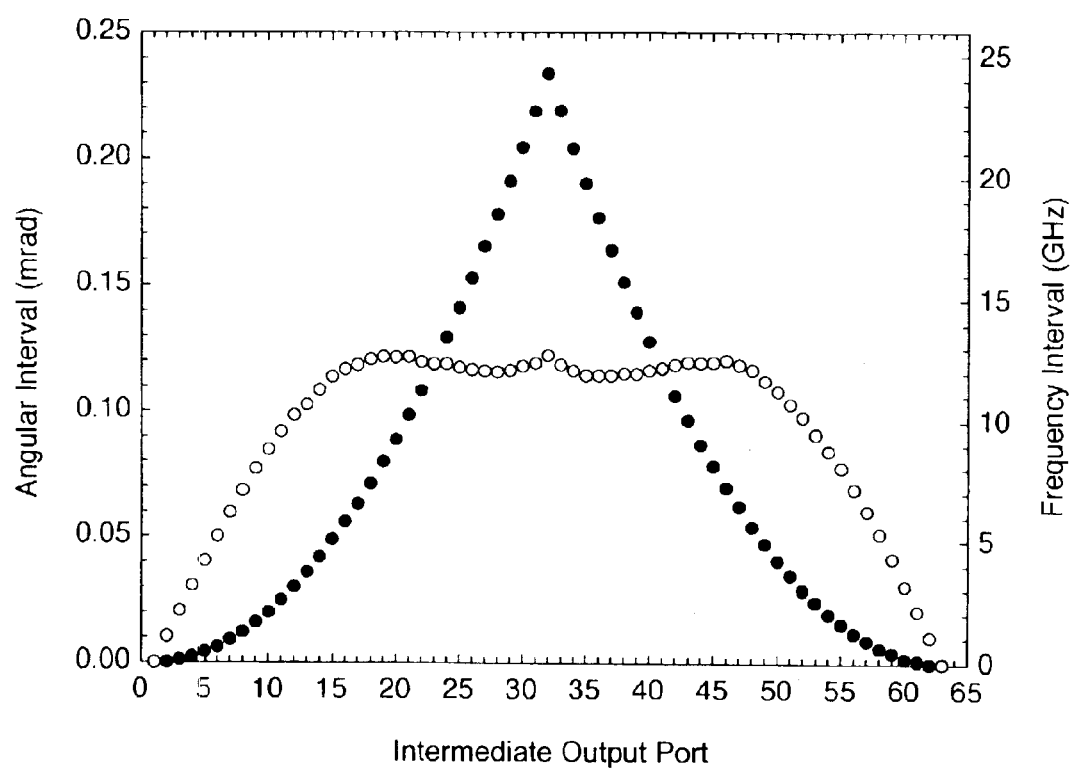
FIG. 6 graphically depicts a comparison of the values of angular interval for an AWG having input and output ports repositioned in accordance with one embodiment of the present invention to the values of the angular interval for the initial distribution.

FIG. 6 graphically depicts a comparison of the values of the angular intervals for a 32×32 AWG comprising 64 intermediate output ports and 32 optical channels spaced by 100 GHz, when the input and output ports are repositioned in accordance with the present invention, to the values of the angular interval for the initial distribution (i.e., before the input and output ports were repositioned). It should be noted that although only 2P−1=63 intermediate output ports are required, 64 output channels may be used for the purposes of symmetry and design simplicity. In FIG. 6, the values of the angular intervals are plotted in the vertical axis and the channel numbers are plotted in the horizontal axis. The darkened circle line curve depicts the angular interval values for the initial distribution of the AWG. The light circle line curve depicts the angular interval values for the AWG after the input and output ports are repositioned in accordance with the present invention. As depicted in FIG. 6, the most problematic region for large angular intervals occur around the central intermediate output ports where image combs with the largest and the narrowest teeth distance are expected to overlap.

As evident in FIG. 6, the maximum deviation is almost halved when the input and output ports are repositioned in accordance with the present invention. After the intermediate output ports are coupled into pairs as described above and in accordance with the present invention, a maximum deviation expected at each combined output port is going to be the largest value between the mismatch at the output ports i and i+32.

It will be appreciated by those skilled in the art informed by the teachings of the present invention that in alternate embodiments of the present invention, the method and concepts described above for the optimization of the positioning of the input and output ports of an AWG may be implemented for both, optical channels that are equally spaced in wavelength and optical channels that are equally spaced in frequency. Even further, the method and concepts described above for the optimization of the positioning of the input and output ports of an AWG may be implemented with optical channels that are not equally spaced.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of increasing the transmission efficiency of a P×Q arrayed waveguide grating (AWG) comprising: arranging the spacing and position of the P input ports and the Q output ports of said arrayed waveguide grating so as to increase a signal transmission coefficient from each of the P input ports to the Q output ports, wherein said arranging comprises:

initially positioning a first input port near the center of the AWG;

initially positioning the Q output ports at positions defined by images of wavelengths dispersed by the first input port;

initially positioning the remaining P−1 input ports of said AWG at positions defined by images of wavelengths dispersed by a substantially central output port of said AWG;

determining an angular spread, $\Delta\vartheta_q$, for each of the Q output ports, where $\Delta\vartheta_q$ is the angular spread of the images of wavelengths expected to converge on each of the output ports;

determining a final position for the P input ports by varying the initial position of the input ports until a value of $\Delta\vartheta_{MAX}$ is minimized, where $\Delta\vartheta_{MAX}$ is a maximum one of the determined angular spreads, $\Delta\vartheta_q$, for each of the output ports; and repositioning the output ports of said AWG such that each output port is positioned in substantially the center of its respective final angular spread, $\Delta\vartheta_q$, wherein said respective final angular spreads are defined by the images of the wavelengths dispersed by the finally positioned input ports.

2. The method of claim 1, wherein at least said initially positioned first input port comprises Q wavelengths that result in Q images for determining the initial positions of the Q output ports.

3. The method of claim 1, wherein said initially positioned substantially central output port comprises P wavelengths that result in P images for determining the initial positions of the remaining P−1 input ports.

4. An arrayed waveguide grating (AWG) comprising:

an input P×M star coupler;

an output M×Q star coupler; and

M waveguides of unequal length connecting said input and output star couplers;

wherein an initial position of a first input port is chosen to be near the center of the AWG and an initial position of the remaining P−1 input ports of said AWG is defined by images of wavelengths dispersed by a substantially central output port, and a final position of the input ports is defined by a subsequent variation of the defined initial position of the input ports, such that a value of $\Delta\vartheta_{MAX}$ is minimized, where $\Delta\vartheta_{MAX}$ is a maximum one of respective angular spreads, $\Delta\vartheta_q$, of the images of the wavelengths expected to converge for each of the output ports; and wherein the position of the output ports of said AWG are positioned substantially in the center of respective final angular spreads, $\Delta\vartheta_q$, of images of wavelengths expected to converge for each of the output ports, wherein said respective final angular spreads are defined by the images of the wavelengths dispersed by the finally positioned input ports.

5. The AWG of claim 4, wherein the center axis of each output port is repositioned to maximize the weakest wavelength signal transmission coefficient for any wavelength dispersed from any of the P input ports.

6. The AWG of claim 4, wherein one or more wavelengths appearing at one or more of the Q output ports are of different diffraction orders.

7. The AWG of claim 4, wherein the wavelengths appearing at the Q output ports are of the same diffraction order.

8. The AWG of claim 4, wherein the spacing between adjacent output ports of said output coupler varies in an asymmetric and non-linear manner from a central output port.

9. The AWG of claim 4, wherein said output star coupler comprises at least 2P−1 intermediate output ports.

10. The AWG of claim 4, wherein said input star coupler comprises P equally spaced input ports, each of said input ports comprising Q equally spaced optical channels, and wherein the output ports of said output coupler are not uniformly spaced.

11. The AWG of claim 10, wherein said Q equally spaced optical channels are equally spaced in wavelength.

12. The AWG of claim 10, wherein said Q equally spaced optical channels are equally spaced in frequency.

13. The AWG of claim 4, wherein the number of input ports is equal to the number of output ports, P=Q.

14. The AWG of claim 4, wherein the spacing between adjacent output ports of said output coupler varies in an asymmetric and non-linear manner from a substantially central output port.

15. A method of designing a P×Q arrayed waveguide grating (AWG) comprising:
  initially positioning a first input port near the center of the AWG;
  initially positioning the Q output ports at positions defined by images of wavelengths dispersed by the first input port;
  initially positioning the remaining P−1 input ports of said AWG at positions defined by images of wavelengths dispersed by a substantially central output port of said AWG;
  determining an angular spread, $\Delta\vartheta_q$, for each of the Q output ports, where $\Delta\vartheta_q$ is the angular spread of the images of wavelengths expected to converge on each of the output parts;
  determining a final position for the P input ports by varying the initial position of the input ports until a value of $\Delta\vartheta_{MAX}$ is minimized, where $\Delta\vartheta_{MAX}$ is a maximum one of the determined angular spreads, $\Delta\vartheta_q$, for each of the output ports; and
  repositioning the output ports of said AWG such that each output port is positioned in substantially the center of its respective final angular spread, $\Delta\vartheta_q$, wherein said respective final angular spreads are defined by the images of the wavelengths dispersed by the finally positioned input ports.

16. The method of claim 15, wherein at least said initially positioned first input port comprises Q wavelengths that result in Q images for determining the initial positions of the Q output ports.

17. The method of claim 15, wherein said initially positioned substantially central output port comprises P wavelengths that result in P images for determining the initial positions of the remaining P−1 input ports.

* * * * *